US012670875B2

(12) United States Patent
Qiu et al.

(10) Patent No.: US 12,670,875 B2
(45) Date of Patent: Jun. 30, 2026

(54) INFORMATION PROMPTING DEVICE AND ULTRASONIC SCANNING SYSTEM

(71) Applicant: Yukun (Beijing) Technology Co., Ltd., Beijing (CN)

(72) Inventors: Xiaokang Qiu, Beijing (CN); Qianyi Zhang, Beijing (CN)

(73) Assignee: Yukun (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 19/174,906

(22) Filed: Apr. 9, 2025

(65) Prior Publication Data

US 2025/0239230 A1 Jul. 24, 2025

Related U.S. Application Data

(63) Continuation of application No. PCT/CN2023/117669, filed on Sep. 8, 2023.

(30) Foreign Application Priority Data

Oct. 10, 2022 (CN) ........................ 202211235168.1

(51) Int. Cl.
*G09G 3/34* (2006.01)

(52) U.S. Cl.
CPC ....... *G09G 3/342* (2013.01); *G09G 2310/024* (2013.01); *G09G 2330/04* (2013.01)

(58) Field of Classification Search
CPC ............. G09G 3/342; G09G 2310/024; G09G 2330/04
See application file for complete search history.

(56) References Cited

U.S. PATENT DOCUMENTS

| | | | | |
|---|---|---|---|---|
| 2014/0336511 A1 | 11/2014 | Hoshino et al. | | |
| 2016/0306098 A1* | 10/2016 | Fujita | .................. | G02B 6/0036 |
| 2017/0211781 A1 | 7/2017 | Sun et al. | | |
| 2021/0080934 A1 | 3/2021 | Cameron et al. | | |
| 2023/0125118 A1* | 4/2023 | Amagi | ................ | A61B 8/5246 600/441 |

(Continued)

FOREIGN PATENT DOCUMENTS

| | | |
|---|---|---|
| CN | 2008093254 A | 4/2008 |
| CN | 107865668 A | 4/2018 |
| CN | 111399659 A | 7/2020 |

(Continued)

OTHER PUBLICATIONS

International Search Report in International application No. PCT/CN2023/117669 mailed on Sep. 25, 2023.

(Continued)

*Primary Examiner* — Lixi C Simpson
(74) *Attorney, Agent, or Firm* — Zhigang Ma

(57) ABSTRACT

An information prompting device includes a display module having a display area, and a light source module. The display module is configured to display an ultrasonic scanning video frame in the display area. The light source module is configured to receive abnormal position information obtained by a detection device detecting the ultrasonic scanning video frame, and illuminate, according to the abnormal position information, an abnormal position in the ultrasonic scanning video frame displayed in the display area as a prompt.

15 Claims, 5 Drawing Sheets

(56) References Cited

U.S. PATENT DOCUMENTS

| | | | | |
|---|---|---|---|---|
| 2023/0142763 | A1* | 5/2023 | Kikuchi | G16H 50/20 382/128 |
| 2024/0095916 | A1* | 3/2024 | Hatsutani | G06V 10/25 |

FOREIGN PATENT DOCUMENTS

| | | | |
|---|---|---|---|
| CN | 114785927 | A | 7/2022 |
| CN | 115590550 | A | 1/2023 |
| CN | 219594645 | U | 8/2023 |

OTHER PUBLICATIONS

Written Opinion of the International Search Authority in International application No. PCT/CN2023/117669, mailed on Sep. 25, 2023.

* cited by examiner

INFORMATION PROMPTING DEVICE AND ULTRASONIC SCANNING SYSTEM

CROSS-REFERENCE TO RELATED APPLICATIONS

This application is a continuation of an International Application No. PCT/CN2023/117669, filed on Sep. 8, 2023, which claims priority to Chinese Patent Application No. 202211235168.1, filed on Oct. 10, 2022. The disclosures of the abovementioned applications are incorporated herein by reference in their entireties.

TECHNICAL FIELD

The present disclosure relates to medical device technologies, and in particular to an information prompting device and an ultrasonic scanning system.

BACKGROUND

Ultrasonic scanning is a common imaging method in modern medicine. During ultrasonic scanning, a person usually holds an ultrasonic scanner to press a target area of the human body and slowly scan it, thereby generating an ultrasonic scanning video image.

With the development of artificial intelligence (AI) medicine, during ultrasonic scanning, a physiological tissue structure in the scanned area can be presented in real time on a display screen for a doctor to view, and an abnormal phenomenon in the scanning area may be additionally identified through AI technology and a prompt for the identified abnormal phenomenon may be provided to the doctor. Generally, an ultrasonic scanning video or image including the identified abnormal phenomenon is additionally displayed on another separate display screen as the prompt. That is, two display screens are used therein to display different contents, respectively.

SUMMARY

According to some embodiments of the present disclosure, an information prompting device includes a display module having a display area, and a light source module. The display module is configured to display an ultrasonic scanning video frame in the display area. The light source module is configured to receive abnormal position information obtained by a detection device detecting the ultrasonic scanning video frame, and illuminate, based on the abnormal position information, an abnormal position in the ultrasonic scanning video frame displayed in the display area as a prompt.

According to some embodiments of the present disclosure, an ultrasonic scanning system includes an ultrasonic scanner, a detection device, and an information prompting device. The ultrasonic scanner is configured to obtain an ultrasonic scanning video frame by scanning an object, and transmit the ultrasonic scanning video frame to the information prompting device and the detection device. The detection device is configured to detect the ultrasonic scanning video frame to obtain abnormal position information, and transmit the abnormal position information to the information prompting device. The information prompting device includes a display module having a display area, and a light source module. The display module is configured to display the ultrasonic scanning video frame in the display area. The light source module is configured to receive the abnormal position information from the detection device, and illuminate, based on the abnormal position information, an abnormal position in the ultrasonic scanning video frame displayed in the display area as a prompt.

DETAILED DESCRIPTION

Some embodiments of the present disclosure will be described in detail below with reference to the accompanying drawings. The embodiments are described for illustrative purposes only and are not intended to limit the present disclosure.

Figure 1:
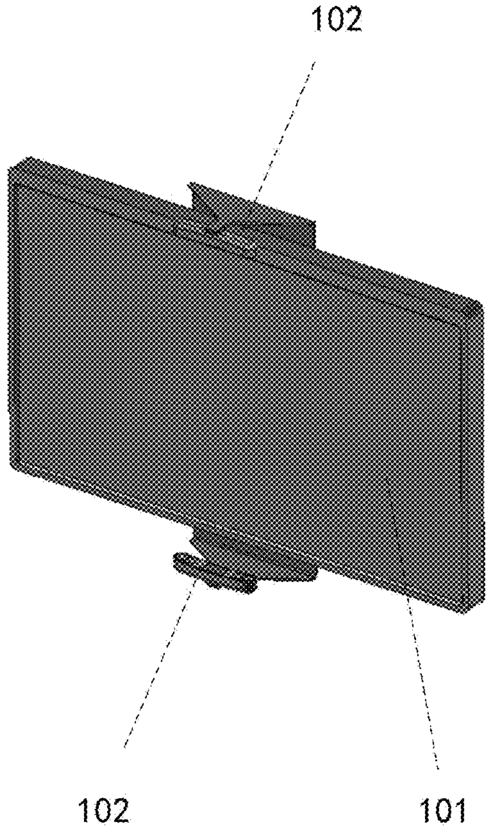
FIG. 1 schematically shows a structure of an information prompting device according to some embodiments of the present disclosure.

As shown in FIG. 1, an information prompting device according to some embodiments of the present disclosure may include a display module 101 and a light source module 102.

Figure 6:
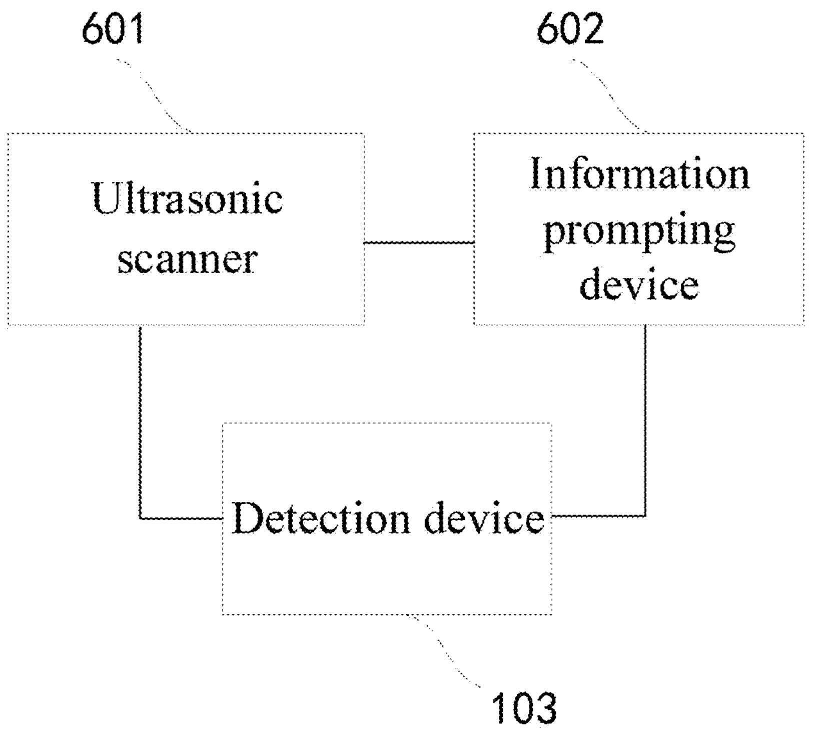
FIG. 6 is a schematic block diagram of an ultrasonic scanning system according to some embodiments of the present disclosure.

The display module 101 has a display area that can be illuminated by the light source module 102. An ultrasonic scanning video frame obtained by scanning an object, for example, with an ultrasonic scanner 601 as shown in FIG. 6, can be displayed in the display area of the display module 101. In addition, a detection device 103 as shown in FIG. 6 can be used to detect any possible abnormal feature in the ultrasonic scanning video frame and obtain abnormal position information corresponding to the abnormal feature. The light source module 102 can receive the abnormal position information from the detection device 103 and illuminate, based on the abnormal position information, an abnormal position in the ultrasonic scanning video frame displayed in the display area as a prompt.

For example, the display module 101 may be any display device, and the light source module 102 may be any device capable of activating a light source therein to emit light onto the display module 101. The light source module 102 may be mounted on the display module 101. As shown in FIG. 1, there may be two light source modules 102 respectively mounted above and below the display module 101. If necessary, the light source module 102 may emit light to illuminate a part of the display area of the display module 101 corresponding to the abnormal position information, so that the abnormal position of the content displayed on the display module 101 is highlighted, thereby providing a prompt for an abnormality.

In this regard, a rotation device may be provided at the connection between the light source module 102 and the display module 101 to adjust the rotation direction of the light source module 102. Thus, the angle of illumination of the display area by the light source module 102 can be changed, and different parts of the display area can be illuminated according to different instructions.

The detection device 103 may include a neural network model for detecting abnormal position information in the ultrasonic scanning video that may be obtained by real-time scanning, for example, with the ultrasonic scanner 601 operated by the user. Since the video consists of successive video frames, the neural network model may detect each video frame of the ultrasonic scanning video to determine whether there is abnormal information therein.

For example, when the video frame is input to the neural network model for detection, the feature extraction module of the neural network model may perform feature extraction on the image information of each position in the video frame. Each extracted image feature corresponds to one image position in the video frame, and can be further detected by the neural network model to determine whether the extracted image feature is abnormal or not. If it is determined that the extracted image feature is abnormal, the extracted image feature can be determined as abnormal information and then an image position in the video frame corresponding to the abnormal information can be determined based on the image position in the video frame corresponding to the extracted image feature. Since the video frame is displayed on the display module 101, a display position of the abnormal information on the display module 101 can be determined based on the image position in the video frame corresponding to the abnormal information, as the abnormal position information of the abnormal information.

When the abnormal position information is determined, the light source module 102 can illuminate a part of the display area corresponding to the abnormal position information to improve the brightness of the part of the display area, thereby achieving the effect of prompting. In some embodiments of the present disclosure, the information prompting device may include a control unit for controlling the light source module 102 to illuminate the part of the display area corresponding to the abnormal position information.

According to some embodiments of the present disclosure, the light source module 102 may be a laser. When the display module 102 displays an ultrasonic scanning video or an ultrasonic scanning image, a certain amount of light is generated in the display area. Since the light beam emitted by the laser is more concentrated and brighter than the general light, a better prompt effect can be achieved by using the laser to illuminate the part of the display area corresponding to the abnormal position information.

With the information prompting device according to some embodiments the present disclosure, while an ultrasonic scanning video or image is displayed in the display area of the display module, the detection device can detect the ultrasonic scanning video or image to obtain the abnormal position information and the light source module can illuminate a part of the display area corresponding to the abnormal position information. That is, the light beam emitted by the light source module can be incident on the ultrasonic scanning video or image in the display area of the display module to provide a prompt for abnormal information. Thus, the ultrasonic scanning video or image and the abnormal information can be simultaneously displayed on one display screen, without an additional display screen.

Figure 2:
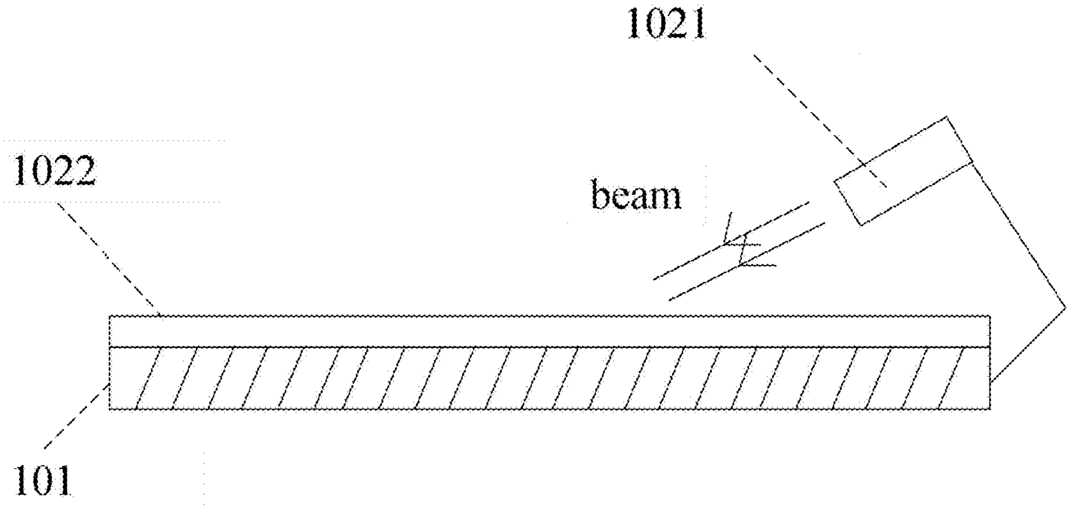
FIG. 2 schematically shows a structure of an information prompting device according to some embodiments of the present disclosure.

In some embodiments of the present disclosure, as shown in FIG. 2, the light source module 102 may include a beam irradiator 1021 and a control module (not illustrated). The beam irradiator 1021 is electrically connected to the control module, and the control module can be electrically connected to the detection device 103. The control module can receive the abnormal position information obtained by the detection device 103 detecting the ultrasonic scanning video frame and control, based on the abnormal position information, the beam irradiator 1021 to project a beam on the ultrasonic scanning video frame displayed in the display area, so as to illuminate an abnormal position in the ultrasonic scanning video frame displayed in the display area as a prompt.

For example, the detection device 103 may transmit the obtained abnormal position information to the control module, and the control module may generate, based on the abnormal position information, a control signal for controlling the beam irradiator 1021 to illuminate a part of the display area, so that the brightness of the part of the display area corresponding to the abnormal position information can be increased, thereby providing a prompt.

Those skilled in the art could appreciate that each of the above-mentioned control module which may be included in the information prompting device and the above-mentioned control module which may be included in the light source module 102 may be any integrated control device, such as a single-chip microcomputer, a central processing unit (CPU), or the like. In addition, the beam irradiator 1021 may be a laser.

In some embodiments of the present disclosure, in order to make the prompt through illumination of the display area more easier for a viewer to observe, the light source module 102 may further include a fluorescent layer, for example, a transparent fluorescent film 1022 as shown in FIG. 2, attached to a surface of the display module 101 in the display area. Based on the abnormal position information obtained by the detection device 103 detecting the ultrasonic scanning video frame, the control module can control the beam irradiator 1021 to project a beam on the fluorescent film 1022, so that the fluorescent film 1022 forms a light spot in the display area to illuminate the abnormal position in the ultrasonic scanning video frame displayed in the display area as a prompt.

In this regard, it can be seen from FIG. 1 that the beam may be emitted from above or below the display module 101 and illuminate a part of the display area of the display module 101. However, the beam will pass over the display area before reaching the part of the display area. If the beam is visible light, it may interfere with the viewer's observation while passing over the display area. In view of this, the beam irradiator 1021 can be configured to emit a beam of invisible light, such as infrared rays, ultraviolet rays, and the like, so that the beam of invisible light may not interfere with the viewer's observation while passing over the display area. Accordingly, the transparent fluorescent film 1022 with a material corresponding to the wavelength of the invisible light emitted by the beam irradiator 1021 is attached to the surface of the display module 101 in the display area. Thus, when the beam of the invisible light emitted by the beam irradiator 1021 is incident on the fluorescent film 1022, the fluorescent film 1022 can convert the wavelength of the invisible light into the wavelength of visible light, thereby forming a light spot in a part of the display area to provide the viewer with a prompt. In some embodiments of the present disclosure, the beam irradiator 1021 may be a laser capable of emitting invisible light or a beam irradiation apparatus capable of emitting light with relatively low brightness.

Figure 3:
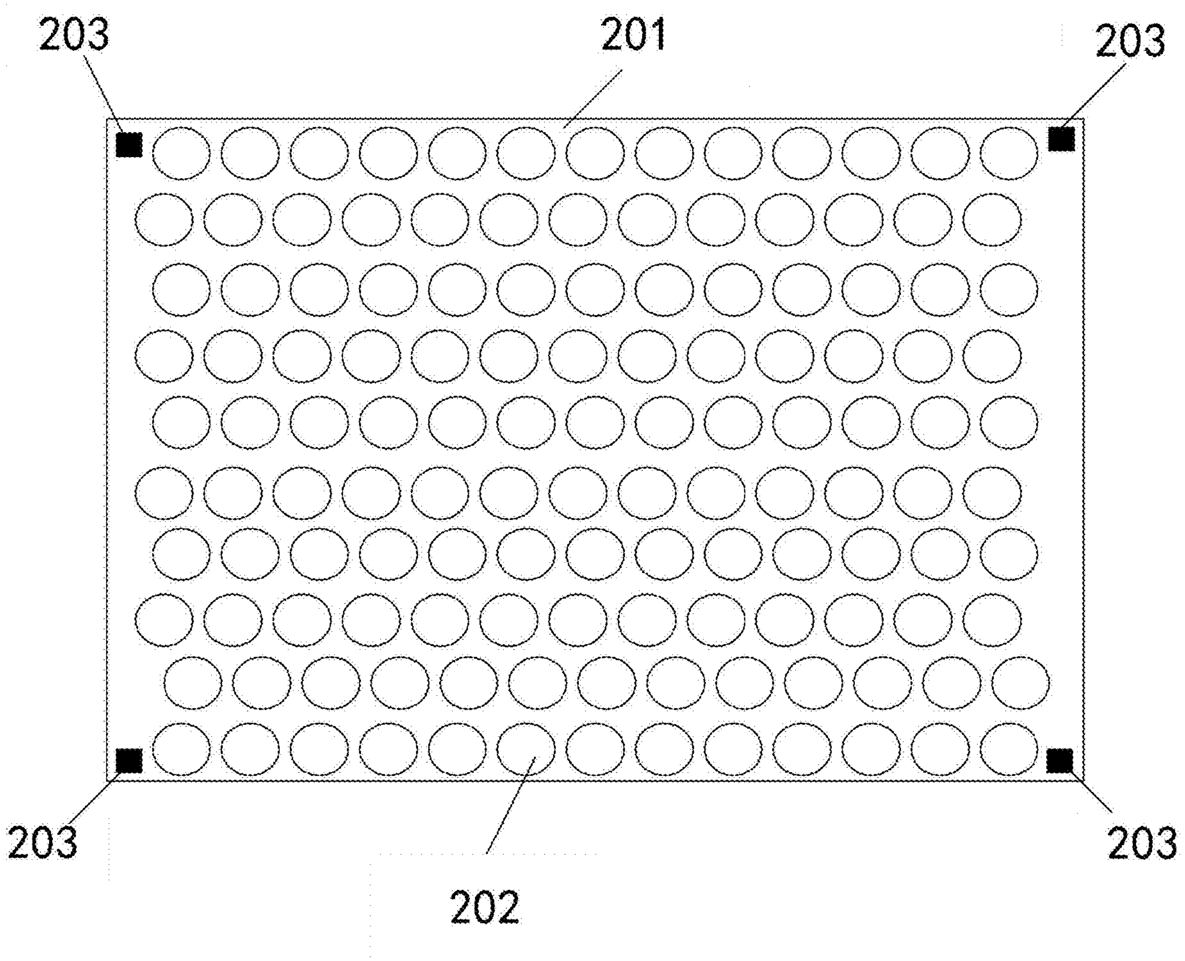
FIG. 3 schematically shows a structure of an information prompting device according to some embodiments of the present disclosure.
Figure 4:
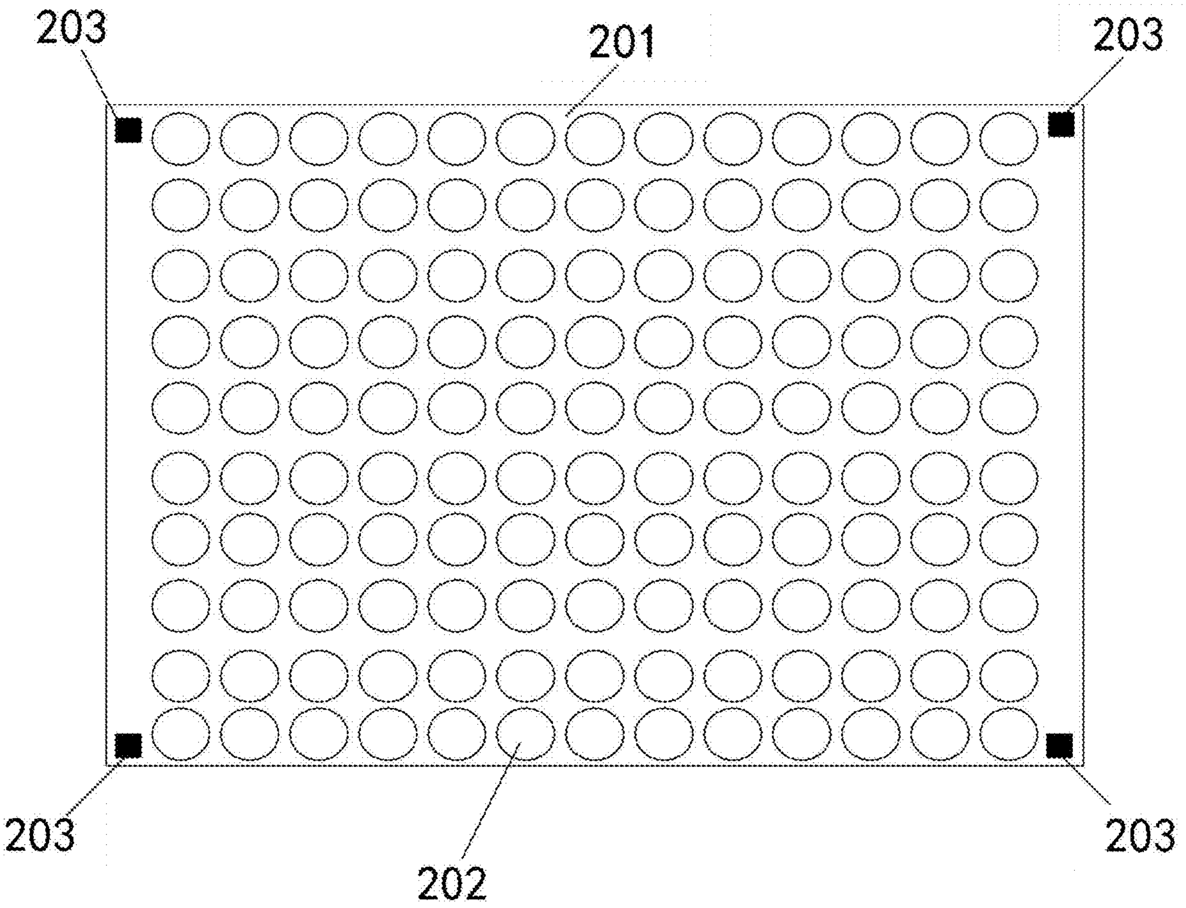
FIG. 4 schematically shows a structure of an information prompting device according to some embodiments of the present disclosure.

In some embodiments of the present disclosure, as shown in FIGS. 3-4, the display area of the display module 101 may be divided into a plurality of display sub-areas, and the light source module 102 may include the control module and a plurality of illuminating lamps 202 disposed to respectively correspond to the display sub-areas. The control module can receive the abnormal position information obtained by the detection device 103 detecting the ultrasonic scanning video frame, determine a target part of the display sub-areas based on the abnormal position information, and control a part of the illuminating lamps 202 corresponding to the target part of the display sub-areas to light up, so as to illuminate an abnormal position in the ultrasonic scanning video frame displayed in the display area as a prompt.

For example, as shown in FIGS. 3-4, a transparent thin film 201 having a shape and a size matching those of the surface of the display module 101 may be provided. Each of the illuminating lamps 202 may be attached to the transparent thin film 201 and then the transparent thin film 201 may be attached to the display module 101 to cover the display area thereof, so that the illuminating lamps 202 are arranged in an array in the display area. For this end, four first fixing devices may be installed respectively at four corners of a frame of the display module 101 surrounding the display area, and four second fixing devices 203 may be installed respectively at four corners of the transparent thin film 201 to engage with the four first fixing devices. One of the four second fixing devices 203 is usually fixed to one of the four first fixing devices on the display module 101 and can function to electrically connect the control module with the illuminating lamps 202. The remaining three of the four second fixing devices 203 can be detached from the remaining three of the four first fixing devices, so that the viewer can remove the transparent thin film 201 from the display area in order to observe the display area.

In some embodiments of the present disclosure, as shown in FIG. 3, the plurality of illuminating lamps 202 may be arranged in a plurality of rows each extending along a direction.

In some embodiments of the present disclosure, as shown in FIG. 4, the plurality of illuminating lamps 202 may be arranged in a plurality of columns each extending along a first direction and a plurality of rows each extending along a second direction perpendicular to the first direction. That is, the plurality of illuminating lamps 202 may be arranged regularly in an array on the transparent thin film 201, which can facilitate manufacturing of the transparent thin film 201 with the illuminating lamps 202 attached manually or by machine.

In some embodiments of the present disclosure, the transparent thin film 201 as shown in FIGS. 3-4 may be replaced with a transparent plate made of hard material. The plurality of illuminating lamps 202 may be arranged on the transparent plate to form a lamp panel, instead of the transparent thin film 201 with the illuminating lamps 202 attached. Compared with the transparent thin film 201, the transparent plate is not easy to deform. This could present the illuminating lamps 202 on the transparent plate from being misaligned with the display sub-areas of the display module 101 after the lamp panel is attached to the display module 101.

Figure 5:
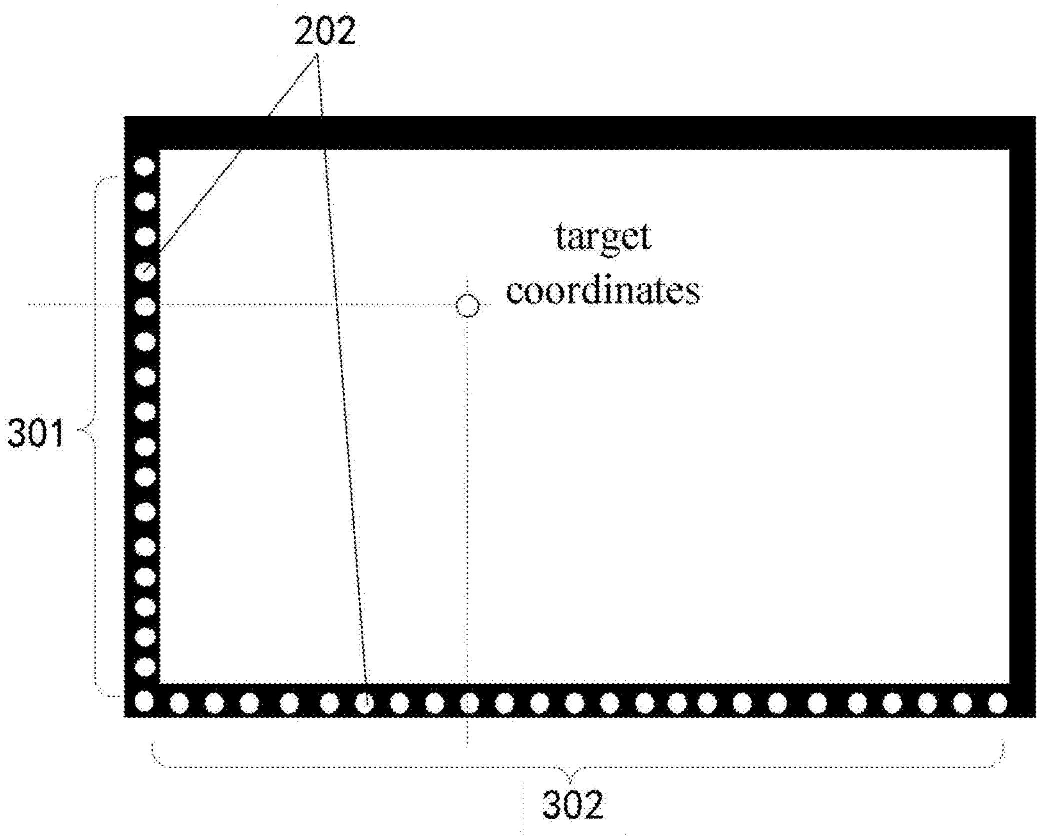
FIG. 5 schematically shows a structure of an information prompting device according to some embodiments of the present disclosure.

In some embodiments of the present disclosure, as shown in FIG. 5, the light source module 102 may include the control module, and a plurality of illuminating lamps 202 arranged on the frame of the display module 101 surrounding the display area. The plurality of illuminating lamps 202 may constitute at least one first lamp strip 301 and at least one second lamp strip 302. The first lamp strip 301 may extend along a first direction and be arranged on a first side bar of the frame of the display module 101. The second lamp strip 302 may extend along a second direction perpendicular to the first direction and be arranged on a second side bar of the frame of the display module 101. In this way, there will be no risk that the transparent thin film 201 with the illuminating lamps 202 attached may fall off the display module 101.

In operation, when the frame of the display module 101 is rectangular, the first lamp strip 301 and the second lamp strip 302 may be regarded as a coordinate system, and the display area of the display module 101 may be regarded as a quadrant of the coordinate system. The control module can receive the abnormal position information obtained by the detection device 103 detecting the ultrasonic scanning video frame, determine target coordinates in the display area based on the abnormal position information, and control a part of the illuminating lamps 202 on the frame of the display module 101 corresponding to the target coordinates to light up, so as to provide a prompt. Thus, an viewer can pay attention to a part of the display area corresponding to the target coordinates indicated by the lighted-up lamps 202, so as to observe the abnormal information in the display area. For example, when the fifth illuminating lamp 202 of the first lamp strip 301 and the tenth illuminating lamp 202 of the second lamp strip 302 are lighted up, the viewer can be prompted that there may be abnormal information at the position of the display area corresponding to the target coordinates indicated by the two lighted-up lamps 202.

In addition, some embodiments of the present disclosure provide an ultrasonic scanning system. As shown in FIG. 6, the ultrasonic scanning system may include the ultrasonic scanner 601, the detection device 103, and an information prompting device 602 according to the above embodiments of the present disclosure. The ultrasonic scanner 601 can transmit the obtained ultrasonic scanning video frame to the information prompting device 602 and the detection device 103. The detection device 103 can detect any possible abnormal feature in the ultrasonic scanning video frame, and obtain and transmit the abnormal position information corresponding to the abnormal feature to the information prompting device 602. The light source module 102 of the information prompting device 602 can illuminate, based on the abnormal position information, an abnormal position in the ultrasonic scanning video frame displayed in the display area of the display module 101 thereof as a prompt. Those skilled in the art should appreciate that the detection device 103 can be integrated into the ultrasonic scanner 601.

In some embodiments of the present disclosure, communication between ultrasonic scanner 601 and information prompting device 602 may be accomplished by any communication means, including, but not limited to, 3rd Generation Partnership Project (3GPP), Long Term Evolution (LTE), Worldwide Interoperability for Microwave Access (WiMAX) based mobile communication, or TCP/IP Protocol Suite (TCP/IP), User Datagram Protocol (UDP) based computer network communication, etc. Of course, the information prompting device 602 may be installed in the ultrasonic scanner 601.

Figure 7:
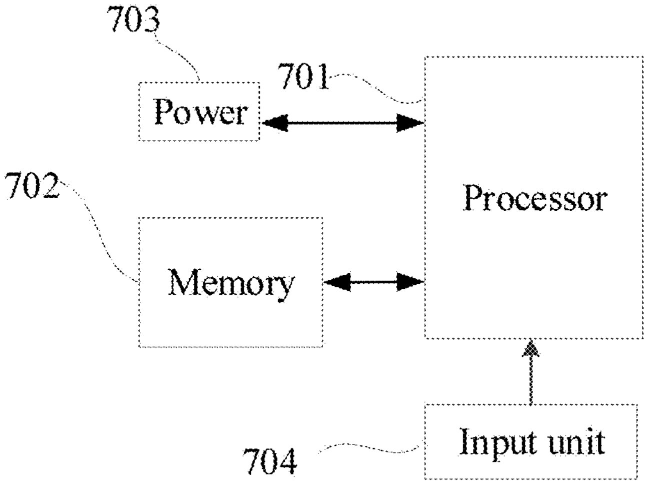
FIG. 7 is a schematic block diagram of a detection device according to some embodiments of the present disclosure.

As shown in FIG. 7, the detection device 103 may include components such as a processor 701 of one or more processing cores, a memory 702 of one or more computer-readable storage media, a power supply 703, and an input unit 704. It will be appreciated by those skilled in the art that the detection device 103 structure shown in FIG. 7 does not constitute a limitation on the detection device, and may include more or less components than illustrated, or may combine certain components, or different component arrangements.

The processor 701 is a control center of the detection device 103, is connected to various parts of the entire detection device 103 by various interfaces and lines, and performs various functions and processes data of the detection device 103 by running or executing software programs and/or modules stored in the memory 702, and invoking data stored in the memory 702.

According to some embodiments of the present disclosure, the processor 701 may include one or more processing cores; The processor 701 may be a Central Processing Unit (CPU) or other general purpose processor, Digital Signal Processor (DSP), Application Specific Integrated Circuit (ASIC), Field-Programmable Gate Array (FPGA) or other programmable logic device, discrete gate or transistor logic device, discrete hardware component, etc. The general purpose processor may be a microprocessor or the processor may be any conventional processor or the like.

According to some embodiments of the present disclosure, the processor 701 may integrate an application processor and a modem processor, wherein the application processor mainly processes an operating system, a user interface, an application program, and the like, and the modem processor mainly processes wireless communication. It will be appreciated that the modem processor may also not be integrated into the processor 701.

The memory 702 may be configured to store software programs and modules, and the processor 701 executes various functional applications and data processing by running the software programs and modules stored in the memory 702. The memory 702 may mainly include a storage program area and a storage data area, wherein the storage program area may store an operating system, an application program required for at least one function, and the like; The storage data area may store data or the like created according to use of the detection device.

In addition, memory 702 may include high speed random access memory, and may also include non-volatile memory, such as at least one magnetic disk storage device, flash memory device, or other volatile solid state storage device. Accordingly, the memory 702 may also include a memory controller to provide access to the memory 702 by the processor 701.

The detection device further includes a power supply 703 for supplying power to each component. For example, the power supply 703 may be logically connected to the processor 701 through the power supply management system, so that functions such as charging, discharging, and power consumption management are managed through the power supply management system. The power supply 703 may further include one or more DC or AC power supplies, a recharging system, a power failure detection circuit, a power converter or inverter, a power status indicator, or any other component.

The detection device may also include an input unit 704 that may be configured to receive input numeric or character information and to generate keyboard, mouse, joystick, optical or trackball signal input related to user settings and functional control.

Although not shown, the detection device may also include a display unit or the like, and details are not described herein. Specifically, in the present embodiment, the processor 701 in the detection device loads the executable files corresponding to the processes of the one or more application programs into the memory 702 according to the related instructions, and the processor 701 runs the application programs stored in the memory 702.

In the above-mentioned embodiments, the description of each embodiment has its own emphasis, and for parts not described in detail in a certain embodiment, reference may be made to the above detailed description for other embodiments.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. An information prompting device, comprising:
a display module having a display area; and
a light source module,
wherein the display module is configured to display an ultrasonic scanning video frame in the display area;
the light source module is configured to receive abnormal position information obtained by a detection device detecting the ultrasonic scanning video frame, and illuminate, based on the abnormal position information, an abnormal position in the ultrasonic scanning video frame displayed in the display area as a prompt;
the light source module comprises a beam irradiator and a control module electrically connected to the beam irradiator;
the control module is configured to receive the abnormal position information from the detection device, and control, based on the abnormal position information, the beam irradiator to project a beam on the ultrasonic scanning video frame displayed in the display area, so as to illuminate the abnormal position as the prompt; and
the beam irradiator is a laser.

2. An information prompting device comprising:
a display module having a display area; and
a light source module,
wherein the display module is configured to display an ultrasonic scanning video frame in the display area;
the light source module is configured to receive abnormal position information obtained by a detection device detecting the ultrasonic scanning video frame, and illuminate, based on the abnormal position information, an abnormal position in the ultrasonic scanning video frame displayed in the display area as a prompt;
the light source module comprises a beam irradiator, a control module electrically connected to the beam irradiator, and a fluorescent film attached to a surface of the display module in the display area; and
the control module is configured to receive the abnormal position information from the detection device, and control, based on the abnormal position information, the beam irradiator to project a beam on the fluorescent film, so that the fluorescent film forms a light spot in the display area to illuminate the abnormal position as the prompt.

3. The information prompting device of claim 2, wherein the beam irradiator is a laser.

4. An information prompting device of claim 1, comprising:

a display module having a display area; and a light source module, wherein the display module is configured to display an ultrasonic scanning video frame in the display area;

the light source module is configured to receive abnormal position information obtained by a detection device detecting the ultrasonic scanning video frame, and illuminate, based on the abnormal position information, an abnormal position in the ultrasonic scanning video frame displayed in the display area as a prompt;

the display area comprises a plurality of display sub-areas;

the light source module comprises a control module, and a plurality of illuminating lamps disposed to respectively correspond to the display sub-areas; and the control module is configured to receive the abnormal position information from the detection device, determine a target part of the display sub-areas based on the abnormal position information, and control a part of the illuminating lamps corresponding to the target part of the display sub-areas to light up, so as to illuminate the abnormal position as the prompt.

5. The information prompting device of claim 4, wherein the illuminating lamps are attached to a transparent thin film, and the transparent thin film is attached to the display module to cover the display area, so that the illuminating lamps are arranged in an array in the display area.

6. The information prompting device of claim 5, wherein the illuminating lamps are arranged in a plurality of columns each extending along a first direction and a plurality of rows each extending along a second direction different from the first direction.

7. The information prompting device of claim 4, wherein the illuminating lamps are arranged on a transparent plate made of hard material to form a lamp panel, and the lamp panel is attached to the display module to cover the display area, so that the illuminating lamps are arranged in an array in the display area.

8. The information prompting device of claim 7, wherein the illuminating lamps are arranged in a plurality of columns each extending along a first direction and a plurality of rows each extending along a second direction different from the first direction.

9. An ultrasonic scanning system, comprising an ultrasonic scanner, a detection device, and an information prompting device, wherein the ultrasonic scanner is configured to obtain an ultrasonic scanning video frame by scanning an object, and transmit the ultrasonic scanning video frame to the information prompting device and the detection device;

the detection device is configured to detect the ultrasonic scanning video frame to obtain abnormal position information, and transmit the abnormal position information to the information prompting device;

the information prompting device comprises a display module having a display area, and a light source module;

the display module is configured to display the ultrasonic scanning video frame in the display area;

the light source module is configured to receive the abnormal position information from the detection device, and illuminate, based on the abnormal position information, an abnormal position in the ultrasonic scanning video frame displayed in the display area as a prompt;

the light source module comprises a beam irradiator and a control module electrically connected to the beam irradiator;

the control module is configured to receive the abnormal position information from the detection device, and control, based on the abnormal position information, the beam irradiator to project a beam on the ultrasonic scanning video frame displayed in the display area, so as to illuminate the abnormal position as the prompt; and the beam irradiator is a laser.

10. An ultrasonic scanning system of claim 9, comprising an ultrasonic scanner, a detection device, and an information prompting device, wherein the ultrasonic scanner is configured to obtain an ultrasonic scanning video frame by scanning an object, and transmit the ultrasonic scanning video frame to the information prompting device and the detection device;

the detection device is configured to detect the ultrasonic scanning video frame to obtain abnormal position information, and transmit the abnormal position information to the information prompting device;

the information prompting device comprises a display module having a display area, and a light source module;

the display module is configured to display the ultrasonic scanning video frame in the display area;

the light source module is configured to receive the abnormal position information from the detection device, and illuminate, based on the abnormal position information, an abnormal position in the ultrasonic scanning video frame displayed in the display area as a prompt;

the light source module comprises a beam irradiator, a control module electrically connected to the beam irradiator, and a fluorescent film attached to a surface of the display module in the display area; and the control module is configured to receive the abnormal position information from the detection device, and control, based on the abnormal position information, the beam irradiator to project a beam on the fluorescent film, so that the fluorescent film forms a light spot in the display area to illuminate the abnormal position as the prompt.

11. An ultrasonic scanning system comprising an ultrasonic scanner, a detection device, and an information prompting device, wherein the ultrasonic scanner is configured to obtain an ultrasonic scanning video frame by scanning an object, and transmit the ultrasonic scanning video frame to the information prompting device and the detection device;

the detection device is configured to detect the ultrasonic scanning video frame to obtain abnormal position information, and transmit the abnormal position information to the information prompting device;

the information prompting device comprises a display module having a display area, and a light source module;

the display module is configured to display the ultrasonic scanning video frame in the display area;

the light source module is configured to receive the abnormal position information from the detection device, and illuminate, based on the abnormal position information, an abnormal position in the ultrasonic scanning video frame displayed in the display area as a prompt;

the display area comprises a plurality of display sub-areas;

the light source module comprises a control module, and a plurality of illuminating lamps disposed to respectively correspond to the display sub-areas; and the control module is configured to receive the abnormal position information from the detection device, determine a target part of the display sub-areas based on the abnormal position information, and control a part of the illuminating lamps corresponding to the target part of the display sub-areas to light up, so as to illuminate the abnormal position as the prompt.

12. The ultrasonic scanning system of claim 11, wherein the illuminating lamps are attached to a transparent thin film, and the transparent thin film is attached to the display module to cover the display area, so that the illuminating lamps are arranged in an array in the display area.

13. The ultrasonic scanning system of claim 12, wherein the illuminating lamps are arranged in a plurality of columns each extending along a first direction and a plurality of rows each extending along a second direction different from the first direction.

14. The ultrasonic scanning system of claim 11, wherein the illuminating lamps are arranged on a transparent plate made of hard material to form a lamp panel, and the lamp panel is attached to the display module to cover the display area, so that the illuminating lamps are arranged in an array in the display area.

15. The ultrasonic scanning system of claim 14, wherein the illuminating lamps are arranged in a plurality of columns each extending along a first direction and a plurality of rows each extending along a second direction different from the first direction.

* * * * *